(12) United States Patent
Laakkonen

(10) Patent No.: US 8,593,734 B2
(45) Date of Patent: Nov. 26, 2013

(54) BEAM EXPANSION WITH THREE-DIMENSIONAL DIFFRACTIVE ELEMENTS

(75) Inventor: Pasi Laakkonen, Kuopio (FI)

(73) Assignee: Nokia Corporation, Espoo (FI)

( * ) Notice: Subject to any disclaimer, the term of this patent is extended or adjusted under 35 U.S.C. 154(b) by 786 days.

(21) Appl. No.: 12/443,475

(22) PCT Filed: Sep. 28, 2006

(86) PCT No.: PCT/IB2006/002696
§ 371 (c)(1),
(2), (4) Date: May 5, 2010

(87) PCT Pub. No.: WO2008/038058
PCT Pub. Date: Apr. 3, 2008

(65) Prior Publication Data
US 2010/0284085 A1    Nov. 11, 2010

(51) Int. Cl.
*G02B 27/14* (2006.01)
*G02B 5/18* (2006.01)
*G02B 6/34* (2006.01)
*G03H 1/00* (2006.01)

(52) U.S. Cl.
USPC ............... 359/630; 359/567; 359/13; 385/37

(58) Field of Classification Search
USPC .......... 359/13, 566, 569, 571, 572, 629–638, 359/567; 385/37
See application file for complete search history.

(56) References Cited

U.S. PATENT DOCUMENTS

| 5,148,302 | A | 9/1992 | Nagano et al. |
| 6,580,529 | B1 | 6/2003 | Amitai et al. |
| 2003/0057417 | A1 | 3/2003 | Lee et al. |
| 2004/0062502 | A1 | 4/2004 | Levola ............................. 385/129 |
| 2004/0109208 | A1* | 6/2004 | Amanai et al. ................... 359/13 |
| 2004/0246874 | A1 | 12/2004 | Takagi et al. ............ 369/112.15 |
| 2004/0252377 | A1 | 12/2004 | Urey |
| 2006/0132914 | A1 | 6/2006 | Weiss et al. .................... 359/462 |

FOREIGN PATENT DOCUMENTS

| EP | 1016817 A1 | 7/2000 |
| WO | 99/52002 A1 | 10/1999 |
| WO | WO 2004/05556 A1 | 7/2004 |
| WO | 2006/035811 A1 | 4/2006 |
| WO | WO-2006/064334 A1 | 6/2006 |

OTHER PUBLICATIONS

Levola, Invited Paper: Diffractive Optics for Virtual Reality Displays, EuroDisplay (Sep. 2005).*
Ang et al., Effects of Grating Heights on Highly Efficient Unibond SOI Waveguide Grating Couplers, IEEE Photonics Technology Letters vol. 12, No. 1 (Jan. 2000).*
Office Action received for corresponding Chinese Patent Application No. 200680055973.9, dated Apr. 15, 2010, 9 pages of Office action and 10 pages of Office action translation.
International Search Report and Written Opinion received for corresponding Patent Cooperation Treaty Application No. PCT/IB2006/002696, dated May 2, 2007, 12 pages.

* cited by examiner

*Primary Examiner* — Alessandro Amari
*Assistant Examiner* — Kimberly N Kakalec
(74) *Attorney, Agent, or Firm* — Harrington & Smith

(57) ABSTRACT

The specification and drawings present a new apparatus and method for using a three-dimensional (3D) diffractive element (e.g., a 3D diffractive grating) for expanding in one or two dimensions the exit pupil of an optical beam in electronic devices. Various embodiments of the present invention can be applied, but are not limited, to forming images in virtual reality displays, to illuminating of displays (e.g., backlight illumination in liquid crystal displays) or keyboards, etc.

21 Claims, 8 Drawing Sheets

BEAM EXPANSION WITH THREE-DIMENSIONAL DIFFRACTIVE ELEMENTS

RELATED APPLICATION

This application was originally filed as PCT Application No. PCT/IB2006/002696 filed Sep. 28, 2006.

TECHNICAL FIELD

The present invention relates generally to electronic devices and, more specifically, to a diffractive optics method that uses a three-dimensional (3D) diffractive element (e.g., a 3D diffraction grating) for expanding the exit pupil of an optical beam.

BACKGROUND ART

In a typical virtual display arrangement (e.g., see PCT patent application WO 99/52002 "Holographic Optical Devices" by Yaakov Amitai and Asher Friesem and U.S. Pat. No. 6,580,529 "Holographic Optical Devices" by Yaakov Amitai and Asher Friesem), the virtual image is typically formed by using several separate linear diffraction gratings. Using separate diffraction elements makes manufacturing of such grating assembly difficult and requires a precise definition of the grating period (e.g., typically two different grating periods are used) and an angle between the periodic lines. Furthermore, it requires a lot of space and the diffraction efficiency is usually dependent on polarization (e.g., strong or weak polarization).

DISCLOSURE OF THE INVENTION

According to a first aspect of the invention, an apparatus, comprises:
a substrate made of an optical material having a first surface and a second surface; and
a three-dimensional diffractive element comprising a plurality of pixels disposed on the substrate, the three-dimensional diffractive element comprises:
at least one area configured to receive an input optical beam, and
at least one further area configured to provide at least one output optical beam with an exit pupil expanded in one or two dimensions,
wherein at least part of the input optical beam is diffracted in the at least one area to provide at least one optical beam substantially within the first and second surfaces, and
at least part of the at least one optical beam is further coupled out of the first or the second surface of the substrate by diffraction in the at least one further area to provide the at least one output optical beam.

According further to the first aspect of the invention, the at least one area and at least one further area may be disposed on one surface, the first or the second surface, of the substrate.

According further to the first aspect of the invention, the at least one area and at least one further area may be disposed on opposite surfaces of the substrate.

Still further according to the first aspect of the invention, each pixel of the plurality of the pixels may have a first width in one direction on the first or second surface, a second width in a perpendicular to the one direction on the first or second surface, and a height. Further, the height of the pixels in the at least one area may be larger than in the at least one further area. Further still, a distance between the pixels in the one direction and in the perpendicular to the one direction may be equal for all the pixels and the first and second widths may be equal for all the pixels.

According further to the first aspect of the invention, a distance between the pixels in the one direction and in the perpendicular to the one direction may not be equal in the at least one area. Further, the pixels in the at least one area may be configured to provide the at least one optical beam substantially in the one direction if the input optical beam has a predetermined first wavelength, and to provide the at least one optical beam substantially in the perpendicular to the one direction if the input optical beam has a predetermined second wavelength different from the predetermined first wavelength.

According still further to the first aspect of the invention, the at least one area has pixels slanted at least in one direction, such that the at least one optical beam is substantially provided in the at least one direction.

According still further to the first aspect of the invention, the at least one area may have at least two types of pixels with an asymmetric shape and slanted in at least two different directions, such that one portion of the at least one optical beam may be substantially provided in one of the at least two different directions and another portion of the at least one optical beam may be substantially provided in another of the at least two different directions. Further, the at least two different directions may be 180 degrees apart.

According yet further still to the first aspect of the invention, the apparatus may further comprise: an absorbing material may be deposited on a surface of the substrate opposite to the surface of the three-dimensional diffractive element and opposite to the at least one area.

Yet still further according to the first aspect of the invention, the apparatus may further comprise: at least one intermediate area such that the at least part of the optical beam diffracted in the at least one area may be first coupled to the at least one intermediate area, which may be configured to substantially couple, using a further diffraction in the at least one intermediate area, the at least part of the diffracted optical beam to the at least one further area to provide the output optical beam with a two-dimensional exit pupil expansion of the input optical beam. Further, the three-dimensional diffractive element may comprise two of the at least two intermediate areas and two of the further diffractive elements to provide two substantially identical images with the expanded exit pupil in the two dimensions from an image comprised in the input optical beam, wherein a portion of the at least part of the input optical beam may be provided to each of the two intermediate areas which may be configured to substantially couple the portion to a corresponding further area of the two further areas for providing the two substantially identical images. Further still, the at least one intermediate area may have pixels slanted in at least one direction, such that the at least one optical beam may be substantially provided in the at least one direction towards the at least one further area.

According to a second aspect of the invention, a method, comprises: receiving an input optical beam by at least one area of a three-dimensional diffractive element comprising a plurality of pixels disposed on a substrate made of an optical material; diffracting at least part of the input optical beam in the at least one area to provide at least one optical beam substantially within the first and second surfaces; and coupling out at least part of the diffracted optical beam of the first or the second surface of the substrate by diffraction in at least one further area of the three-dimensional diffractive element to provide at least one output optical beam with an exit pupil expanded in one or two dimensions.

According further to the second aspect of the invention, the at least one area and at least one further area may be disposed: a) on one surface, the first or the second surface, of the substrate or b) on opposite surfaces of the substrate. Further, each pixel of the plurality of the pixels may have a first width in one direction on the first or second surface, a second width in a perpendicular to the one direction on the first or second surface, and a height. Still further, the height of the pixels in the at least one area may be larger than in the at least one further area.

Further according to the second aspect of the invention, a distance between the pixels in the one direction and in the perpendicular to the one direction may not be equal.

Further, the pixels in the at least one area may be configured to provide the at least one optical beam substantially in the one direction if the input optical beam has a predetermined first wavelength, and to provide the at least one optical beam substantially in the perpendicular to the one direction if the input optical beam has a predetermined second wavelength different from the predetermined first wavelength.

Still further according to the second aspect of the invention, the at least one area may have pixels slanted at least in one direction, such that the at least one optical beam may be substantially provided in the at least one direction.

According further to the second aspect of the invention, before the coupling out the at least part of the diffracted optical beam, the method may comprise: further diffracting the at least part of the optical beam diffracted in at least one intermediate area to substantially couple the at least part of the diffracted optical beam to the at least one further area for providing the output optical beam with a two-dimensional exit pupil expansion of the input optical beam. Further, the three-dimensional diffractive element may comprise two of the at least two intermediate areas and two of the further diffractive elements to provide two substantially identical images with the expanded exit pupil in the two dimensions from an image comprised in the input optical beam, wherein a portion of the at least part of the input optical beam may be provided to each of the two intermediate areas which may be configured to couple the portion to a corresponding further area of the two further areas for providing the two substantially identical images. Further still, the at least one intermediate area may have pixels slanted in at least one direction, such that the at least one optical beam may be substantially provided in the at least one direction towards the at least one further area.

According to a third aspect of the invention, an electronic device, comprises:
  a data processing unit;
  an optical engine operatively connected to the data processing unit for receiving image data from the data processing unit;
  a display device operatively connected to the optical engine for forming an image based on the image data; and
  a three-dimensional exit pupil expander comprising:
  a substrate made of an optical material having a first surface and a second surface; and
  a three-dimensional diffractive element comprising a plurality of pixels disposed on the substrate, the three-dimensional diffractive element comprises:
    at least one area configured to receive an input optical beam, and
    at least one further area configured to provide at least one output optical beam with an exit pupil expanded in one or two dimensions,
    wherein at least part of the input optical beam is diffracted in the at least one area to provide at least one optical beam substantially within the first and second surfaces, and
    at least part of the at least one optical beam is further coupled out of the first or the second surface of the substrate by diffraction in the at least one further area to provide the at least one output optical beam.

Further according to the third aspect of the invention, each pixel of the plurality of the pixels may have a first width in one direction on the first or second surface, a second width in a perpendicular to the one direction on the first or second surface, and a height.

Still further according to the third aspect of the invention, the height of the pixels in the at least one area may be larger than in the at least one further area.

According further to the third aspect of the invention, a distance between the pixels in the one direction and in the perpendicular to the one direction may not be equal in the at least one area.

According still further to the third aspect of the invention, the at least one area may have pixels slanted at least in one direction, such that the at least one optical beam may be substantially provided in the at least one direction.

According to a fourth aspect of the invention, an electronic device, comprises:
  a three-dimensional exit pupil expander comprising:
    a substrate made of an optical material having a first surface and a second surface; and
    a three-dimensional diffractive element comprising a plurality of pixels disposed on the substrate, the three-dimensional diffractive element comprises:
      at least one area configured to receive an input optical beam, and
      at least one further area configured to provide at least one output optical beam with an exit pupil expanded in one or two dimensions,
      wherein at least part of the input optical beam is diffracted in the at least one area to provide at least one optical beam substantially within the first and second surfaces, and
      at least part of the at least one optical beam is further coupled out of the first or the second surface of the substrate by diffraction in the at least one further area to provide the at least one output optical beam;
  at least one component comprising the substrate; and
  a light source driver, responsive to an illumination selection signal, for providing a drive signal to a light source in the component for providing the input optical beam.

According further to the fourth aspect of the invention, the at least one component may be at least one of a liquid crystal display and a keyboard.

According to a fifth aspect of the invention, an apparatus, comprises:
  means for disposing, made of an optical material having a first surface and a second surface; and
  three-dimensional means for diffraction, comprising a plurality of pixels disposed on the means for disposing, the three-dimensional means for diffraction comprises:
    at least one area configured to receive an input optical beam, and
    at least one further area configured to provide at least one output optical beam with an exit pupil expanded in one or two dimensions,
    wherein at least part of the input optical beam is diffracted in the at least one area to provide at least one optical beam substantially within the first and second surfaces, and at least part of the at least one optical beam is further coupled out of the first or the second surface by diffraction in the at least one further area to provide the at least one output optical beam.

According further to the fifth aspect of the invention, the means for disposing may be a substrate.

BRIEF DESCRIPTION OF THE DRAWINGS

For a better understanding of the nature and objects of the present invention, reference is made to the following detailed description taken in conjunction with the following drawings, in which:

FIGS. 1a through 1c are schematic representations of an exit pupil beam expander with 3D diffraction gratings, wherein FIGS. 1b and 1c are magnified views (top and side views respectively) in a vicinity of a corner A of FIG. 1a (top view), according to an embodiment of the present invention;

MODES FOR CARRYING OUT THE INVENTION

Figure 1A:
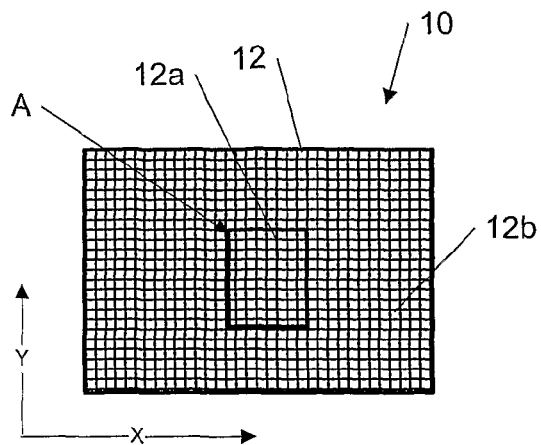

A new method and apparatus are presented for using a three-dimensional (3D) diffractive element (e.g., a 3D diffractive grating) for expanding in one or two dimensions the exit pupil of an optical beam in electronic devices. Various embodiments of the present invention can be applied, but are not limited, to forming images in virtual reality displays, to illuminating of displays (e.g., backlight illumination in liquid crystal displays) or keyboards, etc. The embodiments of the present invention can be applied to a broad optical spectral range of optical beams but most importantly to a visible part of the optical spectrum where the optical beams are called light beams.

According to embodiments of the present invention, the optical device (e.g., the optical device can be a part of a virtual reality display of an electronic device) can comprise a substrate made of an optical material having a first surface and a second surface and a three-dimensional diffractive element (3D) comprising a plurality of 3D pixels disposed on the first or/and the second surface of the substrate.

Furthermore, according to an embodiment of the present invention, said three-dimensional diffractive element can comprise at least one area configured to receive an input optical beam, and at least one further area configured to provide at least one output optical beam out of the substrate with an exit pupil expanded in one or two dimensions compared to the input optical beam. Thus, at least part of the input optical beam is diffracted in the at least one area to provide at least one optical beam substantially within the first and second surfaces substantially due to a total internal reflection, and at least part of the at least one optical beam is further coupled out of the first or the second surface of the substrate by diffraction in the at least one further area for providing the at least one output optical beam.

According to another embodiment, each pixel of the plurality of the pixels can have a first width in one direction (e.g., x direction) on the first or second surface, a second width in a perpendicular to said one direction (e.g., y direction) on the first or second surface, and a height (e.g., in z direction perpendicular to the substrate surface). The first and second widths can be equal for all the pixels or unequal for different pixels. Typically, the height of the pixels in the at least one area can be larger than in the at least one further area (e.g., the height in the at least one area can be 300 nm and the height in the at least one further area can be 50 nm).

According to further embodiments of the present invention, a distance between said pixels in the one direction (or it can be called x-period) and in the perpendicular to said one direction (or it can be called y-period) can be equal for all said pixels or can be unequal. For example, x- and y-periods can be unequal in the at least one area, thus facilitating wavelength dependent coupling in perpendicular directions x and y. For example, in case of unequal x- and y-periods, the pixels in the at least one area can be configured to provide the at least one optical beam substantially in the one direction if the input optical beam has a predetermined first wavelength, and to provide the at least one optical beam substantially in the perpendicular to said one direction if the input optical beam has a predetermined second wavelength different from said predetermined first wavelength (e.g., see example of FIG. 5a).

According to embodiments of the present invention, the 3D pixels (or diffractive pixels) can be manufactured using a variety of techniques, e.g., using electron beam lithography, holographic recording, dry etching, etc., and implemented using a variety of different types of diffraction pixel profiles (e.g., binary, triangular, sinusoidal, etc.). The diffractive pixels can be symmetric or asymmetric profiles in x and y directions relative to a perpendicular to the first and second surfaces of the substrate, e.g., when grooves of the pixels have different slanted angles (i.e., pixels having non-vertical sidewall) in x and/or y directions for coupling an optical beam in a preferred direction. Therefore, one possibility is to have slanted pixels in the at least one area (i.e., the in-coupling area), thus re-directing only wanted components of the input optical beam in a predetermined direction (e.g., x or y direction) defined by a slanted pixel profile.

Figure 3A:
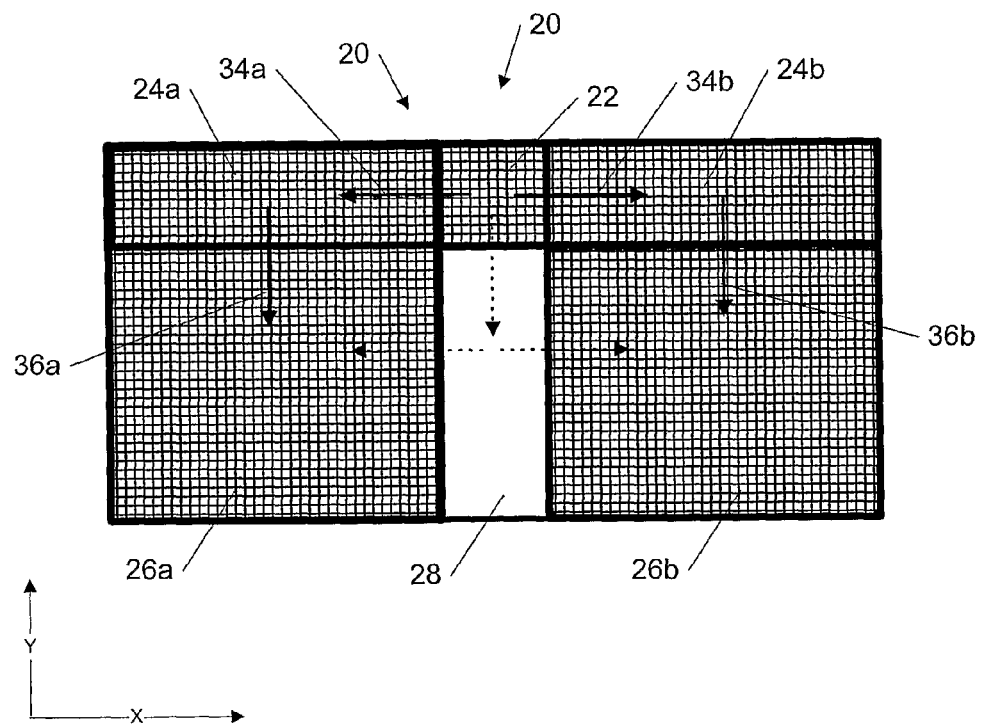
FIG. 3a is a schematic representation of a 3-dimensional exit pupil beam expander for a two dimensional exit pupil expansion, according to an embodiment of the present invention.
Figure 3B:
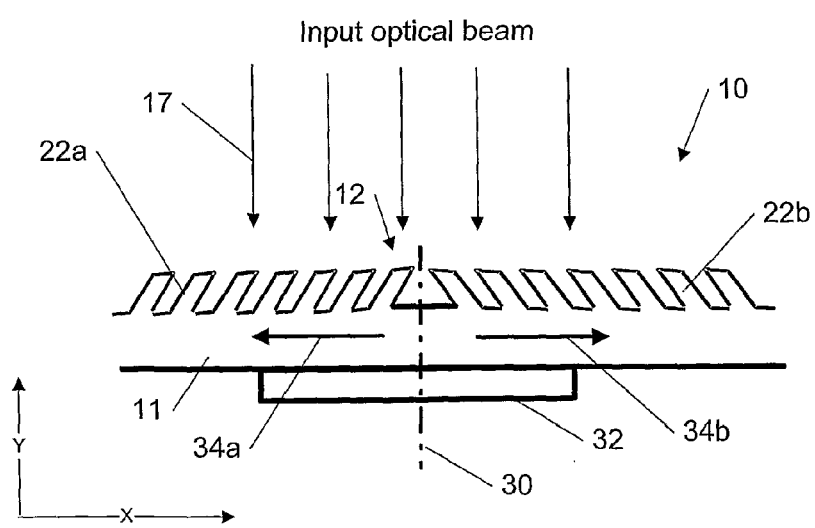
FIG. 3b is a schematic representation of an asymmetric in-coupling grating area implemented as asymmetric slanted pixels, according to an embodiment of the present invention.

Furthermore, the at least one area can have at least two types of pixels with an asymmetric shape and slanted in at least two different directions (e.g., 180 degrees apart), such that one portion of the at least one optical beam is substantially provided in one of the at least two different directions and another portion of said at least one optical beam is substantially provided in another of the at least two different directions (see example shown in FIG. 3b).

Moreover, according to another embodiment of the present invention, an absorbing material can be deposited on a surface of the substrate, opposite to the surface with the disposed three-dimensional diffractive element and opposite to said at least one area, for absorbing optical beams propagating in unwanted directions for improving coupling efficiency in a desired direction (thus e.g., for improving optical contrast of images) as further demonstrated in FIG. 3b.

According to the described embodiments, a uniform (i.e., having identical pixels and their periods throughout) three-dimensional diffraction grating can provide two-dimensional expansion of the exit pupil. However, many variations are possible. According to a further embodiment of the present invention, in order to provide more uniform two-dimensional expansion of the exit pupil of the input beam (e.g., comprising a two-dimensional image) and/or for creating two or more identical images (e.g., for binocular and/or stereoscopic applications), at least one intermediate area can be used in the 3D diffractive element, such that the at least a part of the optical beam diffracted in the at least one area is first coupled to the at least one intermediate area, which then can substantially coupled, using a further diffraction in the at least one intermediate area, the at least part of said diffracted optical beam to the at least one further area for providing the output optical beam for a two-dimensional exit pupil expansion of the input optical beam. Furthermore, the at least one intermediate area can have pixels slanted in at least one direction, such that the at least one optical beam is substantially provided in said at least one direction towards the at least one further area.

Specifically, in case of the virtual reality display applications, the three-dimensional diffractive element can comprise two (or more) of the at least two intermediate areas and two (or more) of the further diffractive elements to provide two (or more) substantially identical images, with the exit pupil expanded in two dimensions, from an image comprised in the input optical beam, wherein a portion of the at least part of the input optical beam can be provided to each of the two intermediate areas which then can be substantially coupled to a corresponding further area of the two further areas for providing the two (or more) substantially identical images. Various examples are provided in FIGS. 3a, 3b and 4.

The embodiments described herein allow using one 3D grating structure in order to produce, e.g., a whole virtual display or backlight illuminating using a compact layout. Moreover, manufacturing of such 3D structure by using only one grating shape is simple and does not require alignment of several gratings which are usually used in virtual reality displays. Furthermore, the diffraction efficiency of this 3D grating structure is estimated to be high.

Also, it is noted that various embodiments of the present invention recited herein can be used separately, combined or selectively combined for specific applications.

Figure 1B:
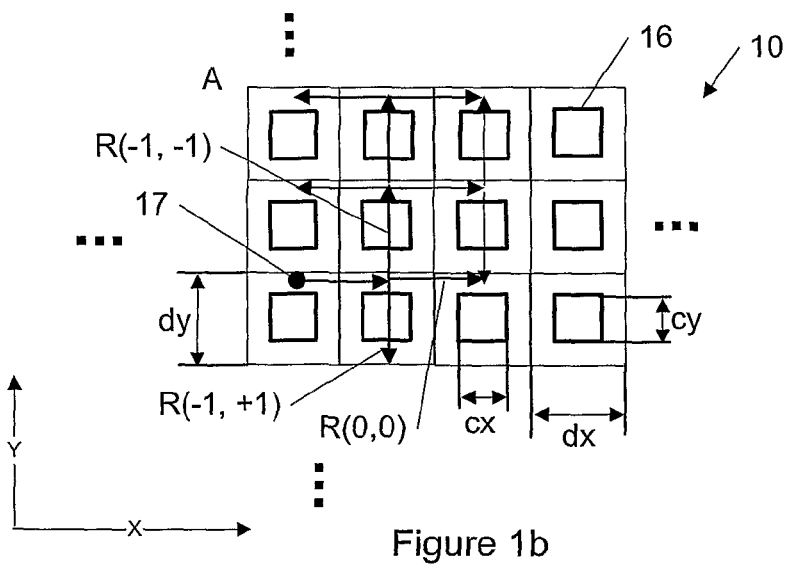
Figure 1C:
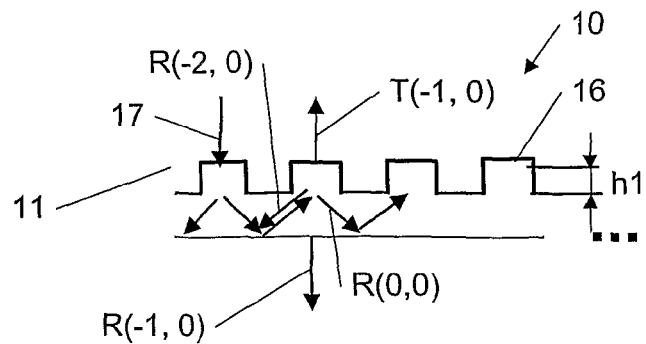

FIGS. 1a and 1b show examples among others of schematic representations (top views) of a 3-dimensional exit pupil beam expander (EPE) 10, wherein FIGS. 1b and 1c are magnified views (top and side views respectively) in a vicinity of a corner A of FIG. 1a, according to an embodiment of the present invention.

Figure 2A:
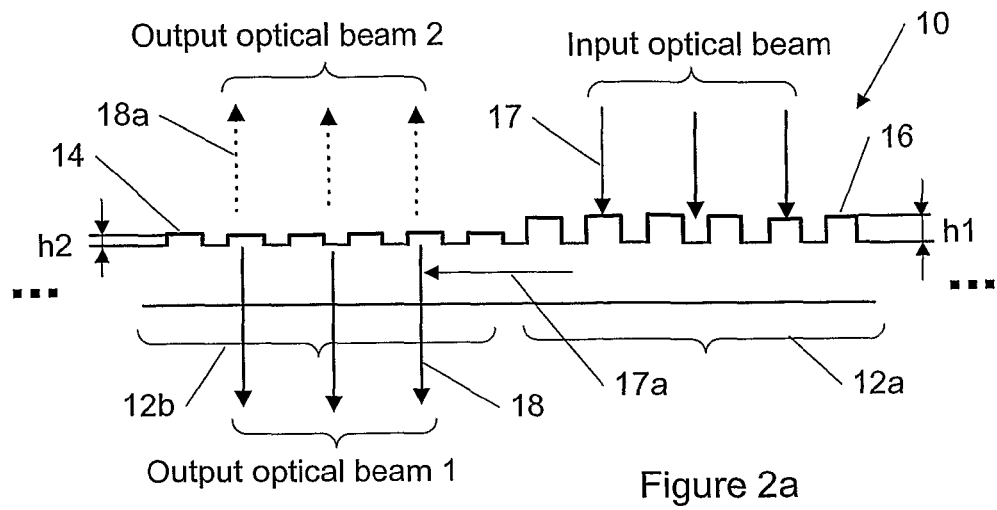
FIGS. 2a through 2c are schematic representations (cross sectional views) of an exit pupil beam expander with 3D diffraction gratings showing beam propagation from an in-coupling to an out-coupling area (FIGS. 2a and 2b) and beam propagation in the out-coupling area (FIG. 2c), according to an embodiment of the present invention.
Figure 2B:
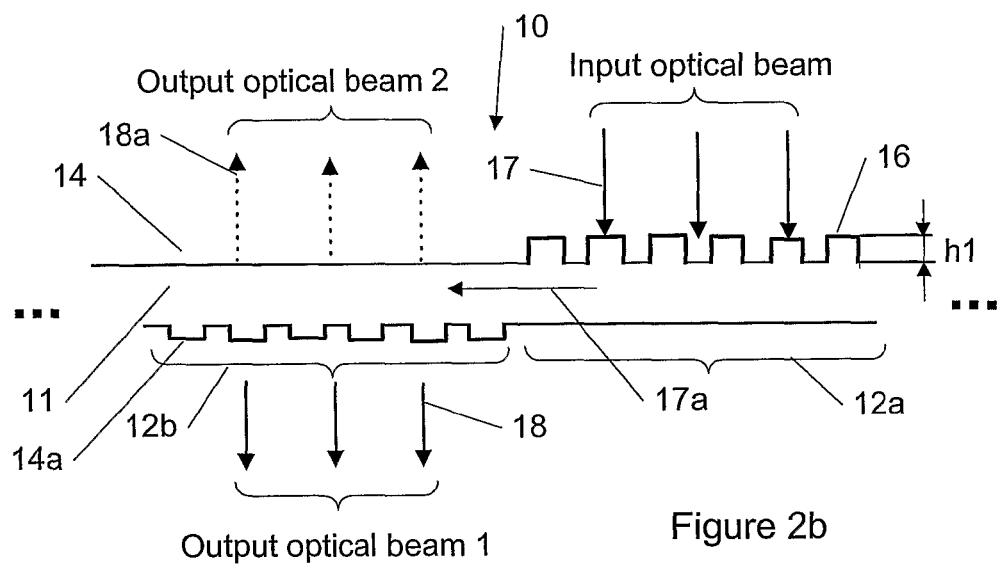

The 3D beam expander 10 is implemented as a 3D diffractive element (grating) 12 which comprises areas 12a for entering by the input optical beam and 12b for out-coupling the output optical beam, wherein the 3D diffractive element is disposed on an optical substrate (waveguide) 11 (see FIG. 2a or 2b). In the example of FIGS. 1a and 1b, only one pixel period is used, e.g., dx=dy=400 nm and the same 3D grating 12 can couple the light into the waveguide in the area 12a and also can couple the light out of the area 12b.

FIG. 1b shows the square grating pixel shape that is more or less an ideal situation: in practice the pixel shape can have, e.g., elliptic or rounded boundaries. Moreover, the pixel grating structure can be, for example, a binary grating (with vertical sidewalls) or a slanted grating (with non-vertical sidewalls). It is also noted that a shape of pixels 14 is determined by widths cx and cy, a depth (see h1 and h2 in FIG. 2a), and a slanted angle (see FIG. 3b), which can be adjusted as a function of the location in the grating area to optimize the best grating performance. The grating fill-factor of the grating is defined by a ratio of cx or cy and corresponding pixel period dx or dy. The design of the 3D pixel grating can be implemented by using rigorous diffraction theory in order to evaluate the diffraction efficiencies of the gratings and/or ray tracing method in order to choose the best pixel grating shape at each point in all areas of the 3D grating 12. FIGS. 1b and 1c further demonstrate the beam propagation inside the substrate 11. When an input optical beam 17 hits the grating surface, the beam will be diffracted into 6 diffraction orders. In all cases the optical beams with diffraction orders R(−1,0) for reflected beam and T(−1,0) for transmitted beam are diffracting out from the system as shown in FIG. 1c. Four more beams, e.g., R(0,0), R(−1,−1), R(−1, +1) and R(−2,0), as shown in FIGS. 1b and 1c, are propagating inside of the substrate (waveguide) 11. It is noted that the out-coupling occurs every time the beam hits the grating surface and it cannot be totally avoided. However, the diffraction grating can be designed in such a manner that it will minimize the out-coupling and diffract more light, e.g., R(−1,+1) and R(−1,−1) diffraction orders, within the substrate 11. Thus, it is illustrated in FIGS. 1b and 1c how the same 3D diffraction grating can expand the optical beam in two dimensions and simultaneously out-couples the output optical beam. It is noted that in the above example the incidence angle is substantially zero, if we have an oblique angle the coupled beams are not propagating directly in x or y directions but still 6 beams exist.

Figure 2C:
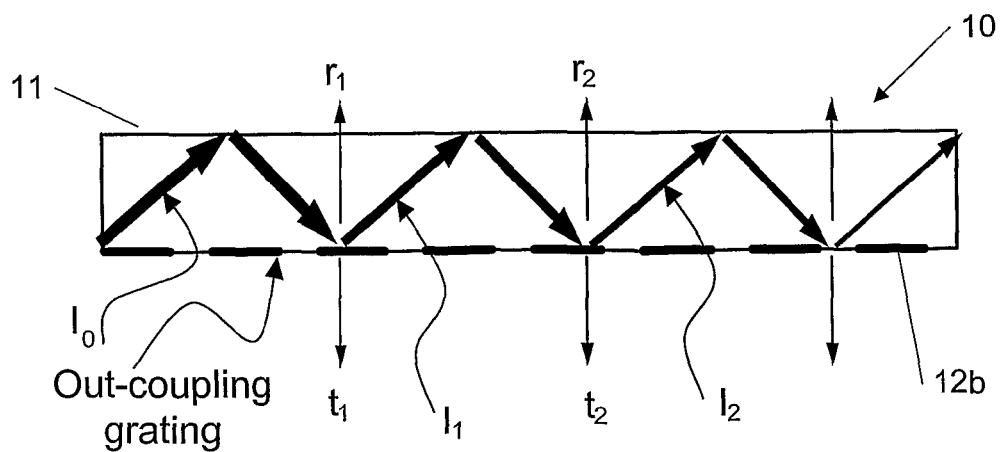

FIGS. 2a through 2c show further examples among others of schematic representations (cross sectional views) of a 3-dimensional exit pupil beam expander 10 showing beam propagation from the in-coupling area 12a to the out-coupling area 12b (FIGS. 2a and 2b) and beam propagation in the out-coupling area 12b (FIG. 2b), according to embodiments of the present invention.

For example, in the area 12a the pixel height h1 can be relatively large (e.g., ~300 nm) for providing a high coupling efficiency (a coupled optical beam is shown as a beam 17a; the beam 17a indicates a propagation direction of an optical power whereas the actual beam is propagated by multiple reflection and/or diffraction in the waveguide 11) of an input optical beam 17, and in the area 12b the pixel height h2 can be relatively small (e.g., ~50 nm) for achieving a uniform out-coupling of the beams 18 and/or 18a. FIG. 2b demonstrates the embodiment when out-coupling area 12b is disposed on another surface of the substrate 11 than the in-coupling area 12a.

The light can be coupled out of the out-coupling area 12b as shown in FIG. 2c in detail. The amount of out-coupling at each time the beam meets the grating depends on the grating properties. The system can be designed so that at least for one wavelength and incoming angle the output is uniform, i.e. $r_1 = r_2 = \ldots$, as shown in FIG. 2c, wherein $r_1, r_2, \ldots$ and $t_1, t_2, \ldots$ are reflected and transmitted optical beams out of the EPE 10, respectively, and I1, I2 ... are reflected optical beams inside the EPE 10 by the total internal reflection.

FIG. 3a shows an example among others of a schematic representation of a 3-dimensional exit pupil beam expander 20 implemented as one diffractive element for a two-dimensional exit pupil expansion, according to an embodiment of the present invention. The input optical beam enters in the area 22 which couples two optical beams 34a and 34b in two opposite directions, e.g., along x axis, to intermediate areas 24a and 24b, respectively. Then the beams 34a and 34b are coupled in a perpendicular direction, e.g., along y-axis (see optical beams 36a and 36b), by the intermediate areas 24a and 24b (which can be optimized for high efficiency coupling, using, for instance, slanted pixels for that direction based on a diffraction analysis and the design requirements) to out-coupling areas 26a and 26b, respectively, to provide two expanded substantially identical images of an image comprised in the input optical beam, thus providing the virtual reality image. It is noted that the optical signal can "leak" out of the intermediate area (i.e., to be seen by a viewer) as explained in regard to FIGS. 1b and 1c.

Area 28 can be left without diffractive pixels or be coated with an absorbing material to minimize contributions (i.e., coupled optical beam to the areas 26a and 26b) from the area 28 in the output optical beam. It is noted that area 28 can be also filled with the pixels. In this case, more power efficiency can be provided (i.e., more power is coupled to the areas 36a and 36b possibly at the expense of an image contrast. Also, if all pixels of the exit pupil beam expander 20 are identical, in principal the whole area of the expander 20 can be used for viewing an image expanded in two dimensions.

FIG. 3b shows a schematic representation of an in-coupling grating area 22, which can be used in the example of FIG. 3a, implemented using asymmetric slanted pixels divided into two parts 22a and 22b with asymmetric slanted angles adjacent to a line 30 as shown, according to an embodiment of the present invention. Then the input optical beam 17 can be coupled as the beam 34a substantially in one x direction by the slanted part 22a and as the beam 34b substantially in the opposite x direction by the slanted part 22a, for providing a high contrast of the two optical images comprised in the output optical beam.

The optical contrast can be further improved by providing an absorbing material (e.g., an absorbing coating) 30 on a surface of the substrate 11 opposite to the substrate surface with the area 22 in a vicinity of the line 30 (as shown in FIG. 3b). If the width of the absorbing area is optimized to be small enough compared to the total width of the area 22, only the unwanted optical beams will be absorbed. These unwanted beams are the optical beams which are transmitted by the areas 22a and 22b without diffracting and those diffracted beams that propagate in unwanted directions.

It is noted that the grating shape of the out-coupling and/or intermediate areas can be also slanted (slanted angle with respect to z axis shown as line 30 in FIG. 3b). The slanted angle can either be with respect to x-direction, y-direction or an intermediate direction (which defines a slanted rotation angle as an angle between this intermediate direction and the x-direction) depending on the appropriate design and application. For example, if a slanted pixel has the slanted angle of 4 degrees and slanted rotation angle of 45 degrees, then the grating can reflect about 80% of light into one direction with the diffraction order R(−1,−1). It is also noted that the grating shape (cx, cy, depth, and slanted angles) can be adjusted as a function of the location in the grating area: The goal is to optimize the best grating performance for sufficient and equal intensity out-coupling and beam expansion.

Figure 4:
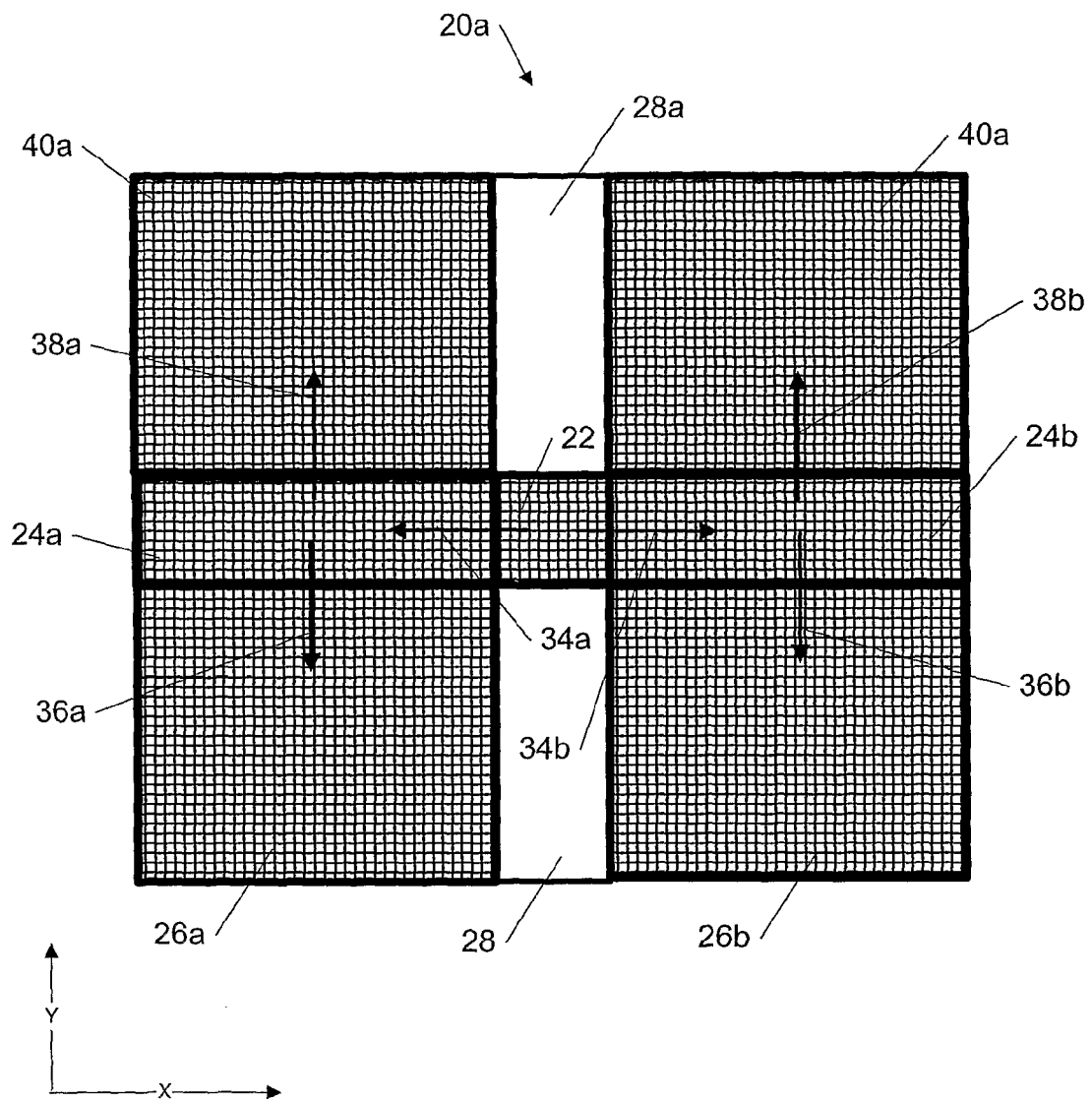
FIG. 4 is a schematic representation of a 3-dimensional exit pupil beam expander using an alternative implementation, according to an embodiment of the present invention.

FIG. 4 shows another example of a schematic representation of a 3-dimensional exit pupil beam expander 20a using another implementation, according to an embodiment of the present invention. Here, each of the intermediate areas 24a and 24b (compare with FIG. 3a) couples, e.g., using slanted grating approach shown in FIG. 3b, optical beams into two opposite directions: beams 36a and 38a are coupled by the intermediate area 24a to the corresponding out-coupling areas 26a and 40a and beams 36b and 38b are coupled by the intermediate area 24b to the corresponding out-coupling areas 26b and 40b. Thus the 3D EPE 20a of FIG. 4 is configured to provide four expanded substantially identical images of an image comprised in the input optical beam.

It is noted (similar to FIG. 3a) that areas 28 and 28a can be also filled with the pixels. In this case, more power efficiency can be provided (i.e., more power is coupled to the out-coupling areas 36a, 36b, 38a and 38b possibly at the expense of an image contrast.

Figure 5A:
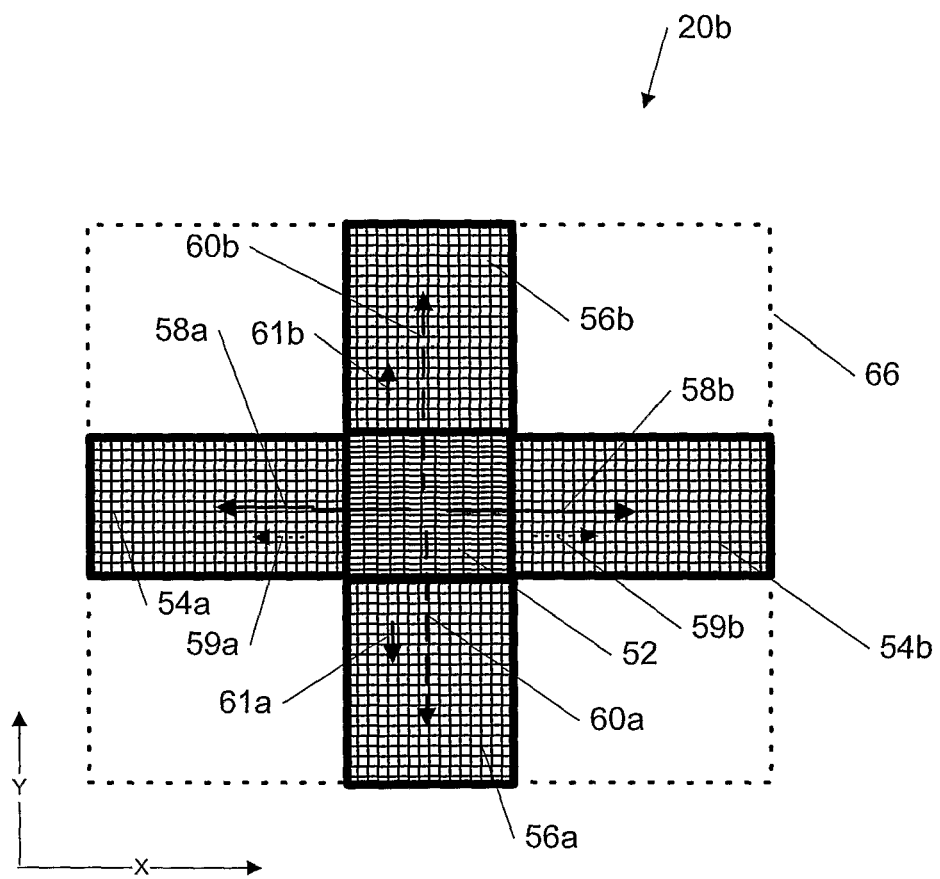
FIGS. 5a and 5b are schematic representations of a 3-dimensional exit pupil beam expander with different pixel periods in x and y directions, according to embodiments of the present invention.
Figure 5B:
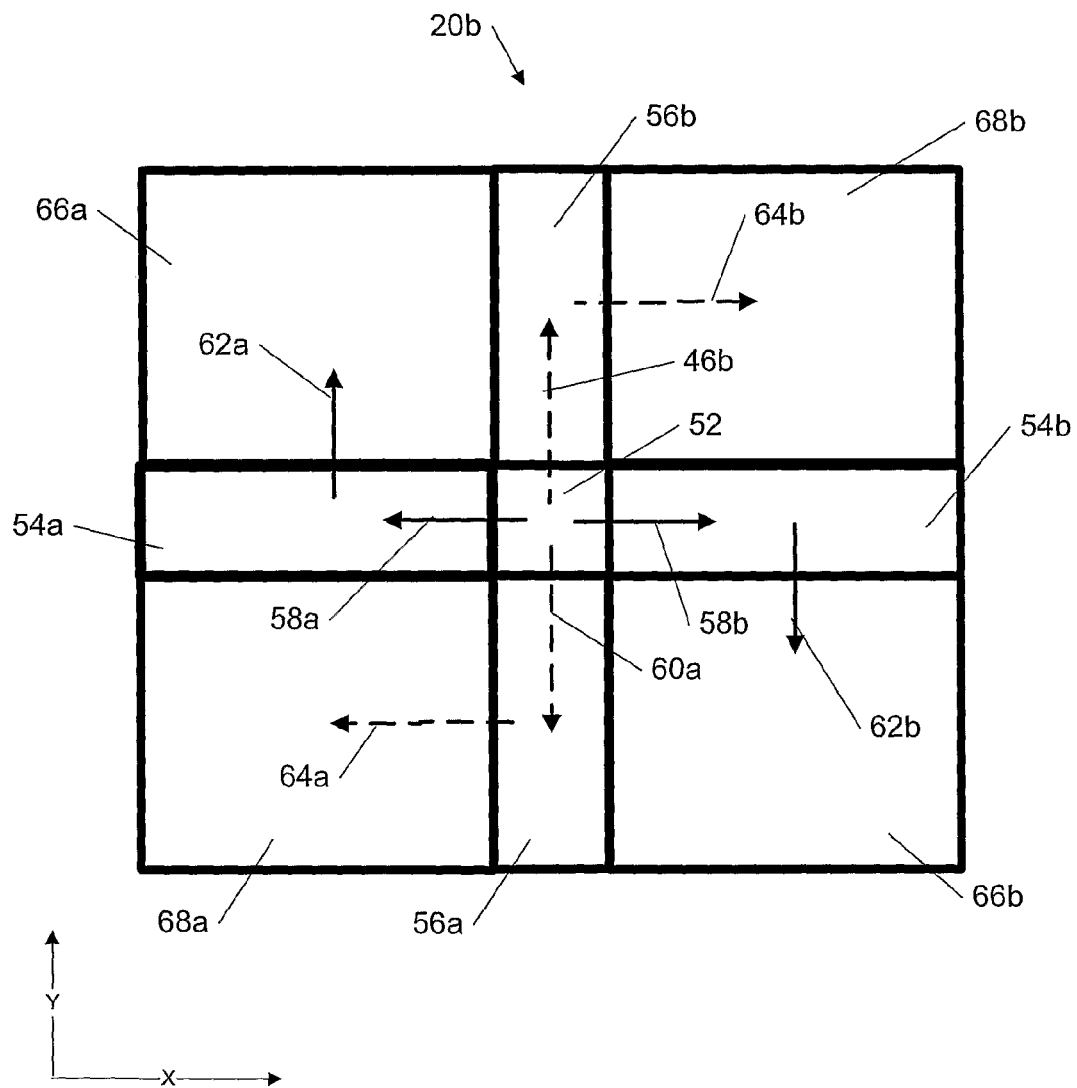

FIG. 5a is a schematic representation of a 3-dimensional exit pupil beam expander 20b with different pixel periods in x and y directions, according to embodiments of the present invention. The pixel period in x direction (x-period) in the in-coupling area 52 is chosen to couple the optical beams 58a and 58b substantially in the x direction to areas 54a and 54b, respectively, if the input optical beam has a predetermined first wavelength. The areas 54a and 54b can have pixel periods in x and/or y directions matching the x-direction pixel period of the area 52. Similarly, the pixel period in y direction (which is different than the x-period) in the in-coupling area 52 is chosen to couple the optical beams 60a and 60b substantially in the y direction to areas 56a and 56b, respectively, if the input optical beam has a predetermined second wavelength, which is different than the first wavelength. The areas 56a and 56b can have pixel periods in x and/or y directions matching the y-direction pixel period of the area 52. The areas 54a, 54b, 56a and 56b can serve as out-coupling elements. Alternatively, these areas can serve as intermediated areas for creating two-dimensional exit pupil expanders as shown in an example of FIG. 5b. In FIG. 5b, the beams 62a, 62b, 64a and 64b are further coupled to corresponding out-coupling areas 66a, 66b, 68a and 68b. Thus, the out-coupling areas 66a and 66b can provide two substantially identical images of the image comprised in the input optical beam at the first predetermined wavelength, whereas the out-coupling areas 68a and 68b can provide two substantially identical images of the image comprised in the input optical beam at the second predetermined wavelength.

It is noted that in FIG. 5a an area 66 indicated by a dotted line can be completely covered with 3D identical grating pixels, so the performance then will be similar to the example of FIG. 1a.

It is noted that using different pixel periods in x and y directions in the intermediate diffractive areas can also serve as a direction selective method for a one-wavelength operation.

Figure 6A:
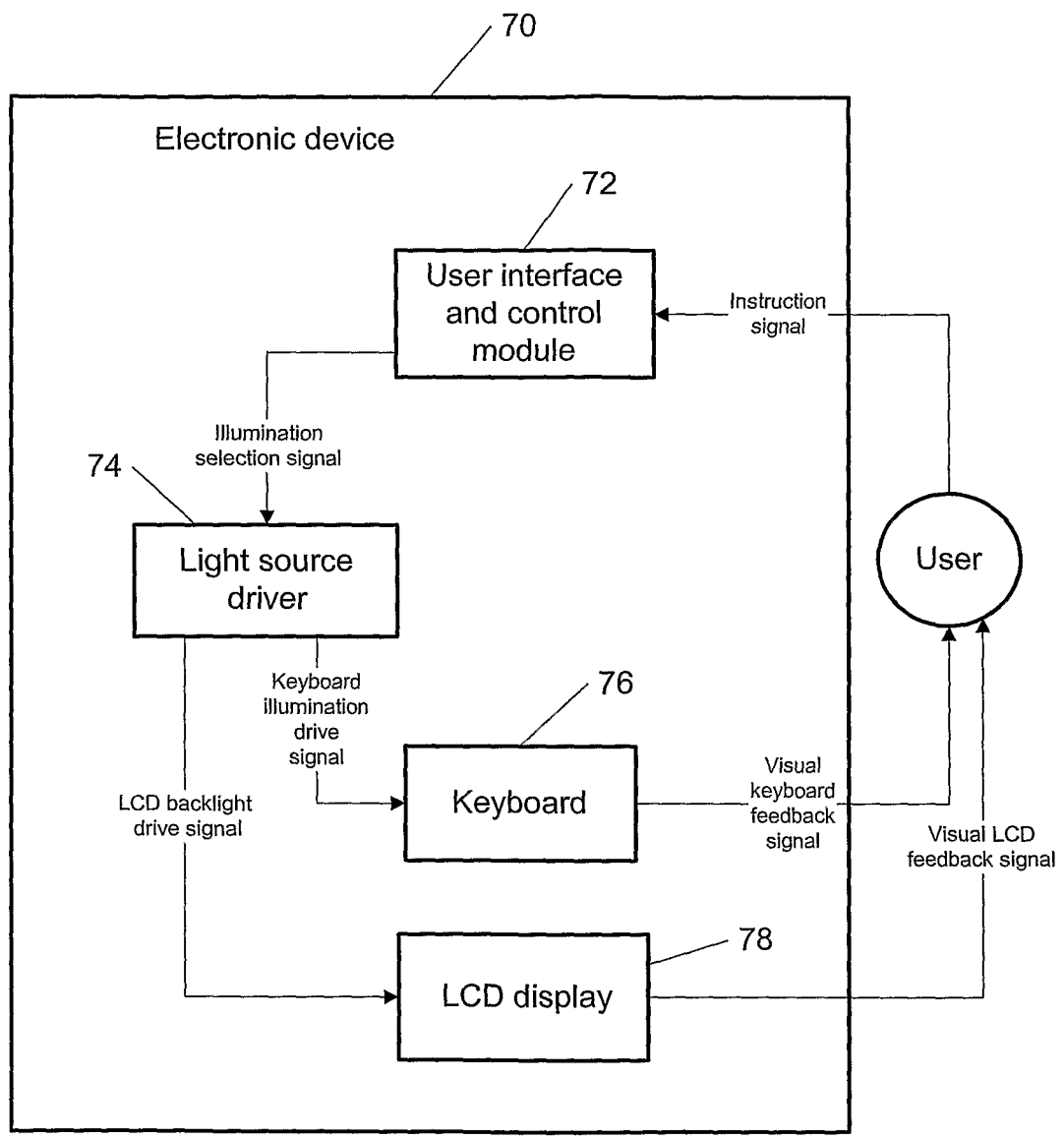
FIGS. 6a and 6b are schematic representations of an electronic device having a 3-dimensional exit pupil expander for illumination (FIG. 6a) and for a virtual reality display (FIG. 6b), according to embodiments of the present invention.

FIG. 6a shows an example among other possible applications of a schematic representation (or a block diagram) of an electronic device 70 having a 3-dimensional exit pupil expander for a backlight illumination, e.g., in the liquid crystal display (LCD) 78 and/or in a keyboard 76, according to an embodiment of the present invention. In response to an appropriate instruction (e.g., from a user), a user interface and control module 72 provides an illumination selection signal to a light source driver, which then provides an appropriate drive signal for a backlight illumination of the LCD 78 and/or the keyboard 76. The module 72 can select, e.g., whether to illuminate the LCD 78, the keyboard 76 or both and possibly with what color.

Figure 6B:
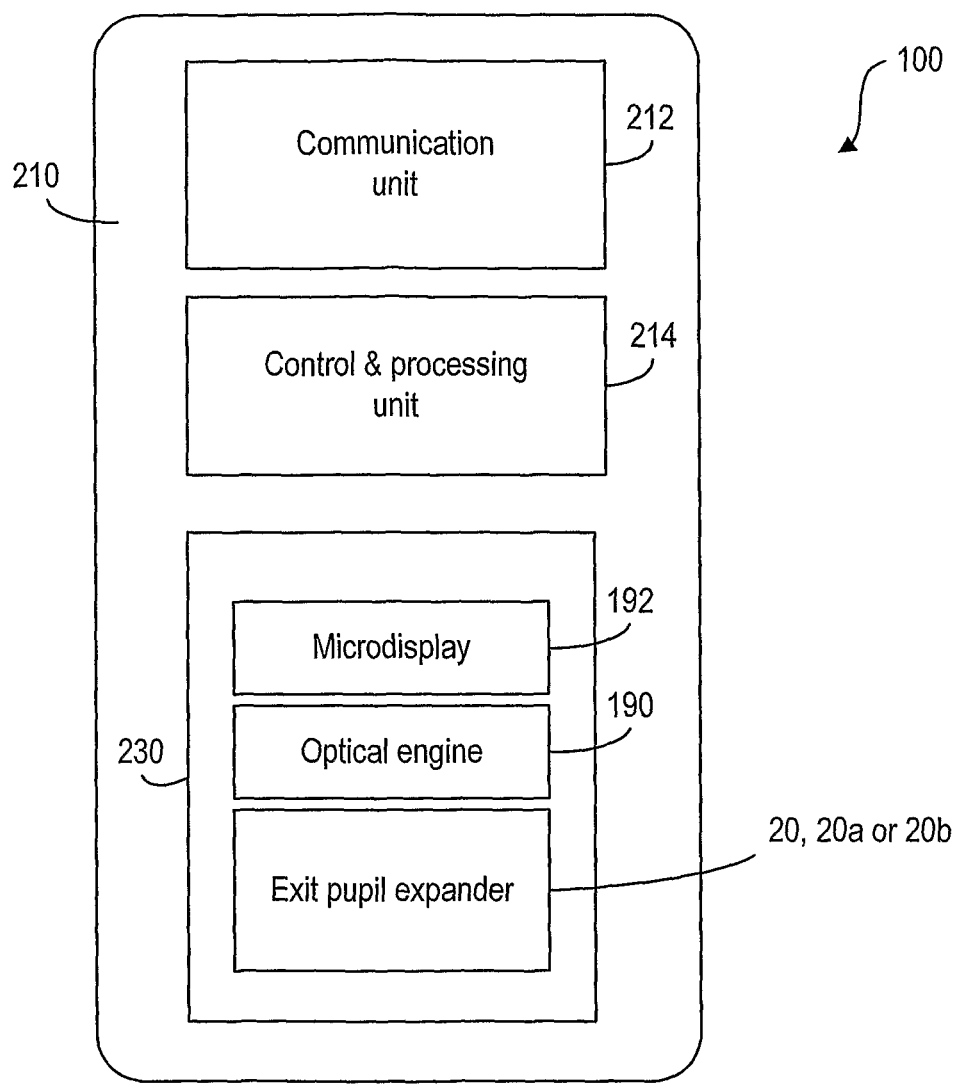

FIG. 6b shows an example of a schematic representation of an electronic device, having the 3D exit pupil expander (EPE) 20, 20a or 20b, according to an embodiment of the present invention.

The 3D exit pupil expander (EPE) 20, 20a or 20b can be used in an electronic (portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 6b, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The 3D EPE 20, 20a or 20b, according to the present invention, can be optically linked to an optical engine 190.

Furthermore, the image source 192, as depicted in FIG. 6, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, handheld computer, digital video and still camera, wearable computer, computer game device, specialized bring-to-the-eye product for viewing and other portable electronic devices. However, the exit pupil expander, according to the present invention, can also be used in a non-portable device, such as a gaming device, vending machine, band-o-matic, and home appliances, such as an oven, microwave oven and other appliances and other non-portable devices.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
    a substrate made of an optical material having a first surface and a second surface; and
    a single three-dimensional diffractive element having a constant period, comprising a plurality of pixels disposed on the substrate, said three-dimensional diffractive element comprising:
    at least one area configured to receive an input optical beam;
    at least one further area configured to provide at least one output optical beam with an exit pupil expanded in one or two dimensions; wherein at least part of the input optical beam is diffracted in said at least one area to provide at least one optical beam substantially within the first and second surfaces and at least part of the at least one optical beam is further coupled out of the first or the second surface of the substrate by diffraction in said at least one further area to provide said at least one output optical beam; and
    wherein the at least one area and the at least one further area are configured such that the single diffractive element expands the at least one optical beam in at least two dimensions and simultaneously out-couples the at least one output optical beam.

2. The apparatus according to claim 1, wherein said at least one area and at least one further area are disposed on at least one of: the first surface, the second surface, and opposite surfaces of said substrate.

3. The apparatus of claim 1, wherein each pixel of said plurality of the pixels has a first width in a first direction, a second width in a second direction perpendicular to said first direction, and a height.

4. The apparatus of claim 3, wherein said height of said pixels in said at least one area is larger than in said at least one further area.

5. The apparatus of claim 3, wherein a distance between said pixels in said one direction and in said perpendicular to said first direction is one of:
    not equal in said at least one area; and
    equal for all said pixels, with said first and second widths being equal for all said pixels.

6. The apparatus of claim 5, wherein said pixels in said at least one area are configured to provide said at least one optical beam substantially in said first direction if the input optical beam has a predetermined first wavelength, and to provide said at least one optical beam substantially in said second direction if the input optical beam has a predetermined second wavelength different from said predetermined first wavelength.

7. The apparatus of claim 1, wherein said at least one area has pixels slanted at least in one direction, such that said at least one optical beam is substantially provided in said at least one direction.

8. The apparatus of claim 1, wherein said at least one area has at least two types of pixels with an asymmetric shape and slanted in at least two different directions, such that one portion of said at least one optical beam is substantially provided in one of said at least two different directions and another portion of said at least one optical beam is substantially provided in another of said at least two different directions.

9. The apparatus of claim 8, wherein said at least two different directions are 180 degrees apart.

10. The apparatus of claim 1, further comprising:
    an absorbing material deposited on a surface of the substrate opposite to the surface of said three-dimensional diffractive element and opposite to said at least one area.

11. The apparatus of claim 1, further comprising:
    at least one intermediate area such that the at least part of the optical beam diffracted in the at least one area is first coupled to said at least one intermediate area, which is configured to substantially couple, using a further diffraction in said at least one intermediate area, said at least part of said diffracted optical beam to the at least one further area to provide said output optical beam with a two-dimensional exit pupil expansion of said input optical beam.

12. The apparatus of claim 11, wherein said three-dimensional diffractive element comprises two of said at least two intermediate areas and two of said further diffractive elements to provide two substantially identical images with the expanded exit pupil in the two dimensions from an image comprised in said input optical beam, wherein a portion of said at least part of the input optical beam is provided to each of said two intermediate areas which is configured to substantially couple said portion to a corresponding further area of said two further areas for providing said two substantially identical images.

13. The apparatus of claim 11, wherein said at least one intermediate area has pixels slanted in at least one direction, such that said at least one optical beam is substantially provided in said at least one direction towards said at least one further area.

14. The apparatus of claim 1, wherein the at least one area and the at least one further area are configured such that the single diffractive element out-couples at least one output optical beam in a direction 180 degrees reversed from the direction in which the input optical beam entered the first area.

15. A method, comprising:
   receiving an input optical beam by at least one area of a single three-dimensional diffractive element having a constant period, comprising a plurality of pixels disposed on a substrate made of an optical material;
   diffracting at least part of the input optical beam in said at least one area to provide at least one optical beam substantially within the first and second surfaces; and
   coupling out at least part of the diffracted optical beam of the first or the second surface of the substrate by diffraction in at least one further area of said three-dimensional diffractive element to provide at least one output optical beam with an exit pupil expanded in one or two dimensions; and
   wherein the at least one area and the at least one further area are configured such that the single diffractive element expands the at least one optical beam in at least two dimensions and simultaneously out-couples the at least one output optical beam.

16. The method of claim 15, wherein said at least one area and at least one further area are formed on at least one of the following: the first surface, the second surface and opposite surfaces on said substrate.

17. The method of claim 16, wherein each pixel of said plurality of the pixels has a first width in a first direction, a second width in a second direction perpendicular to said first direction on said first or second surface, and a height.

18. The method of claim 17, wherein said height of said pixels in said at least one area is larger than in said at least one further area.

19. The method of claim 17, wherein a distance between said pixels in said first direction and in said second direction are not equal.

20. An electronic device, comprising:
   a three-dimensional exit pupil expander comprising: a substrate made of an optical material having a first surface and a second surface; and
   a single three-dimensional diffractive element having a constant period, comprising a plurality of pixels disposed on the substrate, said three-dimensional diffractive element comprises: at least one area configured to receive an input optical beam, and at least one further area configured to provide at least one output optical beam with an exit pupil expanded in one or two dimensions, wherein at least part of the input optical beam is diffracted in said at least one area to provide at least one optical beam substantially within the first and second surfaces, and at least part of the at least one optical beam is further coupled out of the first or the second surface of the substrate by diffraction in said at least one further area to provide said at least one output optical beam; at least one component comprising said substrate; and a light source driver, responsive to an illumination selection signal, for providing a drive signal to a light source in said component for providing said input optical beam;
   wherein the at least one area and the at least one further area are configured such that the single diffractive element expands the at least one optical beam in at least two dimensions and simultaneously out-couples the at least one output optical beam.

21. An electronic device of claim 20, wherein said at least one component is at least one of a liquid crystal display and a keyboard.

* * * * *